(12) United States Patent
Tufvesson et al.

(10) Patent No.: US 9,689,962 B2
(45) Date of Patent: Jun. 27, 2017

(54) DETERMINING THE GEOGRAPHIC LOCATION OF A PORTABLE ELECTRONIC DEVICE

(75) Inventors: Fredrik Tufvesson, Lund (SE); Anders J. Johansson, Lund (SE); Johan Karedal, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1256 days.

(21) Appl. No.: 13/698,690

(22) PCT Filed: May 19, 2011

(86) PCT No.: PCT/SE2011/050632
§ 371 (c)(1),
(2), (4) Date: Jan. 11, 2013

(87) PCT Pub. No.: WO2011/146011
PCT Pub. Date: Nov. 24, 2011

(65) Prior Publication Data
US 2013/0113660 A1 May 9, 2013

(30) Foreign Application Priority Data
May 19, 2010 (SE) ...................... 1050495

(51) Int. Cl.
*G01S 3/02* (2006.01)
*G01S 5/02* (2010.01)
(Continued)

(52) U.S. Cl.
CPC ........ *G01S 5/02* (2013.01); *G01S 5/08* (2013.01); *G01S 5/06* (2013.01); *G01S 5/14* (2013.01); *H04W 64/00* (2013.01)

(58) Field of Classification Search
CPC ..... G01S 5/04; G01S 5/06; G01S 5/08; G01S 5/14
(Continued)

(56) References Cited

U.S. PATENT DOCUMENTS

| 4,734,702 A | 3/1988 | Kaplan |
| 5,502,450 A | 3/1996 | Zablotney et al. |

(Continued)

FOREIGN PATENT DOCUMENTS

| DE | 102005000732 A1 | 7/2006 |
| DE | 102006037247 A1 | 2/2008 |

OTHER PUBLICATIONS

International Preliminary Report on Patentability dated Nov. 20, 2012, corresponding to International Application PCT/SE2011/050632 filed May 19, 2011.

(Continued)

*Primary Examiner* — Chuong P Nguyen
(74) *Attorney, Agent, or Firm* — Renner, Otto, Boisselle & Sklar, LLP

(57) ABSTRACT

A self-positioning portable electronic device comprises a signal receiving unit for receiving a signal from one or more remote transmitters, and a local positioning unit for determining a local position of the device. The device operates to obtain a plurality of data samples from the signal at different time points during a measurement period with movement of the portable electronic device along an arbitrary trajectory, associate each data sample with a local position obtained from the local positioning unit so as to form a synthetic antenna array, obtain an array response of the synthetic antenna array, and identify the geographic location of the portable electronic device, by processing the synthetic (Continued)

antenna array as a function of the array response and using knowledge about the geographic location of the transmitter(s).

24 Claims, 5 Drawing Sheets

(51) Int. Cl.
  *G01S 5/08* (2006.01)
  *G01S 5/14* (2006.01)
  *G01S 5/06* (2006.01)
  *H04W 64/00* (2009.01)

(58) Field of Classification Search
  USPC .......................................... 342/450, 451, 458
  See application file for complete search history.

(56) References Cited

U.S. PATENT DOCUMENTS

| | | | | |
|---|---|---|---|---|
| 6,330,452 B1* | 12/2001 | Fattouche | ............... | G01S 1/045 342/457 |
| 6,493,380 B1* | 12/2002 | Wu | ........................... | G01S 5/02 342/417 |
| 6,670,920 B1* | 12/2003 | Herrick | ............... | G01S 13/9035 342/378 |
| 8,340,588 B2* | 12/2012 | Nielsen | .................. | H04B 7/028 342/372 |
| 8,494,569 B2* | 7/2013 | Nielsen | .................. | H04B 7/084 455/504 |
| 2003/0144007 A1* | 7/2003 | Johansson | ............. | H04W 64/00 455/456.1 |
| 2007/0143005 A1* | 6/2007 | Chiou | .................. | H04W 24/08 701/467 |
| 2007/0285315 A1* | 12/2007 | Davis | ........................ | G01S 3/74 342/377 |
| 2008/0100502 A1 | 5/2008 | Jantunen et al. | | |
| 2011/0070840 A1 | 3/2011 | Nielsen et al. | | |
| 2015/0234033 A1* | 8/2015 | Jamieson | .................. | G01S 5/04 455/456.1 |

OTHER PUBLICATIONS

International Search Report, corresponding to PCT/SE2011/050632, mailed on Aug. 31, 2011.
Broumandan A. et al., 'Direction of arrival estimation of GNSS signals based on synthetic antenna array', ION GNSS 2007, Fort Worth, TX Sep. 25-28, 2007, p. 1-11; I. Introduction, III. Synthetic array concept.
L.M. Correia: Mobile Broadband Multimedia Networks, Academic Press (2006) Chapter 6.6 titled, Multi-antenna radio measurements and results.
Merrill Ivan Skolnik: Introduction to Radar Systems, McGraw-Hill (2002), Chapter 1.1 titled, An Introduction to Radar.
Ph.D. Dissertation "Estimation of radio channel parameters: Models and algorithms", by Andreas Richter, Technische Universitat Ilmenau, Ilmenau, Germany (2005).
"Two Decades of Array Signal Processing Research" by Hamid Krim and Mats Viberg, IEEE Signal Processing Magazine, pp. 67-94, Jul. 1996.
Ph.D. Dissertation "Antenna Array Mapping for DOA Estimation in Radio Signal Reconnaissance", by Per Nyberg, Royal Institute of Technology, Stockholm, Sweden (2005).

\* cited by examiner

DETERMINING THE GEOGRAPHIC LOCATION OF A PORTABLE ELECTRONIC DEVICE

CROSS-REFERENCE TO RELATED APPLICATIONS

The present application claims the benefit of Swedish patent application No. 1050495-9, filed on May 19, 2010, which is incorporated herein by reference.

TECHNICAL FIELD

The present invention relates to a technique for determining the geographic location of a portable electronic device, and in particular a technique that can be used as an alternative or supplement to well-known GNSSs (Global Navigation Satellite Systems).

BACKGROUND

Satellite navigation systems provide autonomous geo-spatial positioning with global or regional coverage. At the present, the dominating GNSS is the Global Positioning System (GPS). A GPS receiver has the ability to determine its geographic location (longitude, latitude, and altitude) to within a few meters using time signals transmitted along a line-of-sight by radio from satellites.

However, there are situations when it is not possible or even permitted for a portable electronic device with a GPS receiver to receive the satellite signals used for positioning. For example, satellite signals might be obscured or blocked when the handheld device in operated indoors. Still further, the GPS system might have inadequate coverage in a specific geographic area, or the satellite signals may be actively jammed to prevent positioning.

Furthermore, it may be desirable to have the option of providing positioning functionality to a portable electronic device without the need to incorporate a GPS receiver, which adds cost, space and energy consumption to the portable electronic device.

It is well-known that antenna arrays with several physical antenna elements (denoted "physical antenna arrays" in the following) can be used for directional estimation of incoming signals. A portable electronic device with a physical antenna array is e.g. disclosed in US2008/0100502. The portable electronic device is moved from a first to a second position, while estimating the direction of arrival of incoming radio signals at the first and second positions by processing the incoming radio signals received from a signal source by the plural antenna elements at the first and the second position, respectively. Further, a built-in motion detector indicates the displacement vector between the first and second positions. The displacement vector in combination with the directions allows the portable electronic device to be positioned relative to the signal source.

One problem with physical antenna arrays is that they are large and bulky and usually consume more space than a portable electric device can afford. They may also require precise calibration, so that the response of each antenna element is known in all possible directions, in order to enable directional estimation.

In the field of antennas, there are also so-called virtual or synthetic antenna arrays which make use of robots to move a single physical antenna element to a number of known positions. The signals recorded at the different positions can be processed just as data from physical antenna arrays, as long as the surroundings of the antenna are sufficiently static during the measurement, and can therefore also be used for directional estimation. Like physical antenna arrays, virtual antenna arrays are bulky, mainly due to the need for a positioning device (usually some kind of robot or rail). Virtual antenna arrays are generally not developed with size constraints in mind, but are rather used to avoid the requirement for (the often cumbersome) calibration or to avoid coupling effects that may arise between the plural antenna elements of a physical antenna array, see e.g. L. M. Correia: Mobile broadband multimedia networks, Academic press (2006) chapter 6.6. Virtual antenna arrays of this type are thus unsuitable for use in portable electronic devices.

The prior art also comprises an article by Broumandan et al: "Direction of arrival estimation of GNSS signals based on synthetic antenna arrays", ION GNSS 2007, 25-28 Sep. 2007, pages 1-11. Broumandan discloses a technique for enhancing GNSS accuracy in urban environments, to reduce the influence of interfering signals generated by reflections of the incoming signals on buildings and other scattering objects in urban environments. This is achieved by determining the directions of the interfering signals and applying adaptive antenna algorithms to design a beamformer to place nulls in the directions of the interfering signals, thereby improving the signal quality of the GNSS signals used for global positioning. Broumandan proposes that an antenna array is synthesized by moving a handheld device with a single antenna in an arbitrary direction while continuously sampling the interference signal. The trajectory of the single array is determined by an inertial measurement unit (IMU) in the handheld device. The resulting set of spatial samples together with the trajectory form a synthetic antenna array, which can be processed for determining the direction of arrival for each interfering signal.

The prior art further comprises DE102006037247, which focuses on solving a multi-path problem in connection with time-of-arrival (TOA) or roundtrip-time-of-flight (TOF) positioning techniques, including GPS. The TOA and TOF techniques are based on obtaining measurement signals that represent the amplitude and phase of a transferred signal dependent on the transit time between a mobile station and each of a plurality of stationary stations. The measurement signals are used for calculating the distance to the each stationary station based on the transit times in the same way as for conventional radar systems, see e.g. Merrill Ivan Skolnik: Introduction to Radar Systems, McGraw-Hill (2002), Chapter 1.1. The multi-path problem arises when signal reflections generate further signal paths in addition to the direct signal transmission path between the mobile station and the stationary station. DE102006037247 suggests solving this problem by generating a synthetic aperture which is designed to form a directionally exact antenna, so as to increase signal-to-noise and reduce the influence of signal reflections on the transit time estimates. It is well known that the resolution of an estimated transmit time is inversely proportional to the bandwidth of the signal; therefore the positioning in DE102006037247 requires a broad-band radio signal to get adequate estimates of transit time. Furthermore, the positioning in DE102006037247 requires synchronization across all the stationary stations, or synchronization between the mobile station and each of the stationary stations.

Another type of single antenna direction-finding system is known from U.S. Pat. No. 5,502,450. Here, a single antenna is arranged on an aircraft to receive a signal from a source while the aircraft moves along a linear flight path. A system connected to the antenna detects periodically occurring symbols in the signal at two positions along the flight path and calculates, based on the corresponding signal transmit time, the distance to the source at each position. The distance between the positions along the flight path is determined using existing navigational means. Based on these distances and applying trigonometry calculations, the system is able to estimate the angle or the distance to the source at a downstream position along the linear flight path.

SUMMARY

It is an object of the invention to at least partly overcome one or more of the limitations of the prior art.

In view of the foregoing, one object is to provide a new positioning technique which is suitable for use in portable electronic devices, i.e. a technique for determining the geographic location of the portable electronic device itself, as an alternative or supplement to the use of conventional GNSS. Another object is to provide a new positioning technique capable of meeting the space constraints of portable electronic devices. Yet another object is to provide a new positioning technique capable of being passive in the sense that the portable device does not have to emit any signals or communicate with other units for positioning itself.

One or more of these objects, and further objects that may appear from the description below, are at least partly achieved by means of a method, a computer program product, a computer-readable medium and portable electronic devices according to the independent claims, embodiments thereof being defined by the dependent claims.

A first aspect of the invention is a method of determining the geographic location of a portable electronic device, said portable electronic device comprising a signal receiving unit configured to receive a signal from at least one remote transmitter, and a local positioning unit for determining a local position of the portable electronic device. The method of the first aspect comprises: obtaining a plurality of data samples from the signal at different time points during a measurement period with random movement of the portable electronic device; associating each data sample with a local position obtained from the local positioning unit so as to form a synthetic antenna array; obtaining an array response of the synthetic antenna array; and identifying the geographic location of the portable electronic device, by processing the synthetic antenna array as a function of the array response and by using knowledge about the geographic location of the or each transmitter.

The first aspect is based on the fundamental insight that the geographic self-positioning of the portable electronic device should be based on the array response of the synthetic antenna array, instead of transit time as conventionally used in GNSS, such as GPS. By processing the synthetic antenna array as a function of the array response, the geographic location may be identified independently of signal transit time between the or each transmitter and the portable electronic device. As noted above, although prior art techniques combine TOA or TOF techniques with a synthetic antenna array, this is not done for positioning, but for shaping and directing a synthetic aperture either towards transmitters to improve signal quality or to determine directions of interfering signals. In other words, in the prior art, the synthetic antenna array is used for obtaining data samples, whereas the inventive method uses the synthetic antenna array when processing the data samples for identifying the geographic location, specifically by processing the synthetic antenna array as a function of the array response.

The array response may be seen as a model of the signal response at the local positions, in terms of at least the phase of the signal, and possibly also the amplitude of the signal, as a function of the relative location between the synthetic antenna array and the transmitter, while neglecting any differences in time delay between the local positions with respect to the transmitter.

In one embodiment, the array response is obtained in the form of a mathematical function that relates the signal response (phase and possibly amplitude at each of the local positions) to one or more parameters that represent the relative location between the synthetic antenna array and the transmitter. Such parameters may e.g. define a direction from the synthetic antenna array to the transmitter, a position of the synthetic antenna array in a coordinate system at the transmitter, or a position of the transmitter in a coordinate system of the portable electronic device. The step of identifying the geographic location may involve extracting the parameter value(s) that causes the mathematical function to (approximately) result in the data samples at the local positions. In other words, the mathematical function is optimized for the data samples at the local positions.

In another embodiment, the array response is obtained in the form of a set of signal responses for different relative locations between the synthetic antenna array and the transmitter, each signal response being represented as phase and possibly amplitude at each of the local positions. The step of identifying the geographic location may involve matching (correlating) the synthetic antenna array to the different signal responses, wherein the relative location is given by the best matching signal response among the set of signal responses.

The inventive method provides a number of technical advantages. For example, by using a synthetic antenna array, the signal receiving unit may be provided with a simple and space-efficient antenna. Further, by using the array response, the inventive method may be implemented without requiring any synchronization between the portable device and the transmitter(s), and/or between transmitters, if the signal is repeated and known to the portable electronic device. Furthermore, an arbitrary signal may be used since the positioning is independent of signal bandwidth. Thus, in contrast to the prior art, the inventive method also allows the use of a narrowband signal, i.e. a signal having a bandwidth $B \ll c_0/\alpha$, where $c_0$ is the speed of light and $\alpha$ is the required spatial resolution of the system. It can be noted that the inventive method works well also when the signal is an unmodulated sinusoidal signal.

It is realized that the inventive method may be used as a replacement of, or a supplement to, conventional GNSS.

It should be emphasized that the step of identifying the geographic position may use additional information, including but not limited to compass information at the portable electronic device, an estimated direction of the gravitational force at the portable electronic device, and an estimated distance between the portable electronic device and the or each transmitter. The estimated distance may be obtained with any available technique, including the above-mentioned TOA and TOF techniques.

A second aspect of the invention is a computer-readable medium comprising program instructions that, when executed by a processor in a portable electronic device, performs the method of the first aspect.

A third aspect of the invention is a computer program product loadable into the memory of a portable electronic device for performing the method of the first aspect.

A fourth aspect of the invention is a portable electronic device, which comprises a signal receiving unit configured to receive a signal from at least one remote transmitter; a local positioning unit for determining a local position of the portable electronic device; and a processor configured to obtain a plurality of data samples from the signal at different time points during a measurement period with random movement of the portable electronic device, associate each data sample with a local position obtained from the local positioning unit so as to form a synthetic antenna array, obtain an array response of the synthetic antenna array, and identify the geographic location of the portable electronic device, by processing the synthetic antenna array as a function of the array response and by using knowledge about the geographic location of the or each remote transmitter.

A fifth aspect of the invention is a portable electronic device, which comprises: a signal receiving unit configured to receive a signal from at least one remote transmitter; a local positioning unit for determining a local position of the portable electronic device; means for obtaining a plurality of data samples from the signal at different time points during a measurement period with random movement of the portable electronic device; means for associating each data sample with a local position obtained from the local positioning unit so as to form a synthetic antenna array; means for obtaining an array response of the synthetic antenna array; and means for identifying the geographic location of the portable electronic device, by processing the synthetic antenna array as a function of the array response and by using knowledge about the geographic location of the or each remote transmitter.

The second to fifth aspects share the technical advantages of the first aspect. Any one of the embodiments of the first aspect may be combined with the second to fifth aspects.

Still other objectives, features, aspects and advantages of the present invention will appear from the following detailed description, from the attached claims as well as from the drawings.

BRIEF DESCRIPTION OF THE DRAWINGS

Embodiments of the invention will now be described herein by way of example only, with reference to the accompanying schematic drawings.

DETAILED DESCRIPTION OF EXEMPLARY EMBODIMENTS

Figure 1:
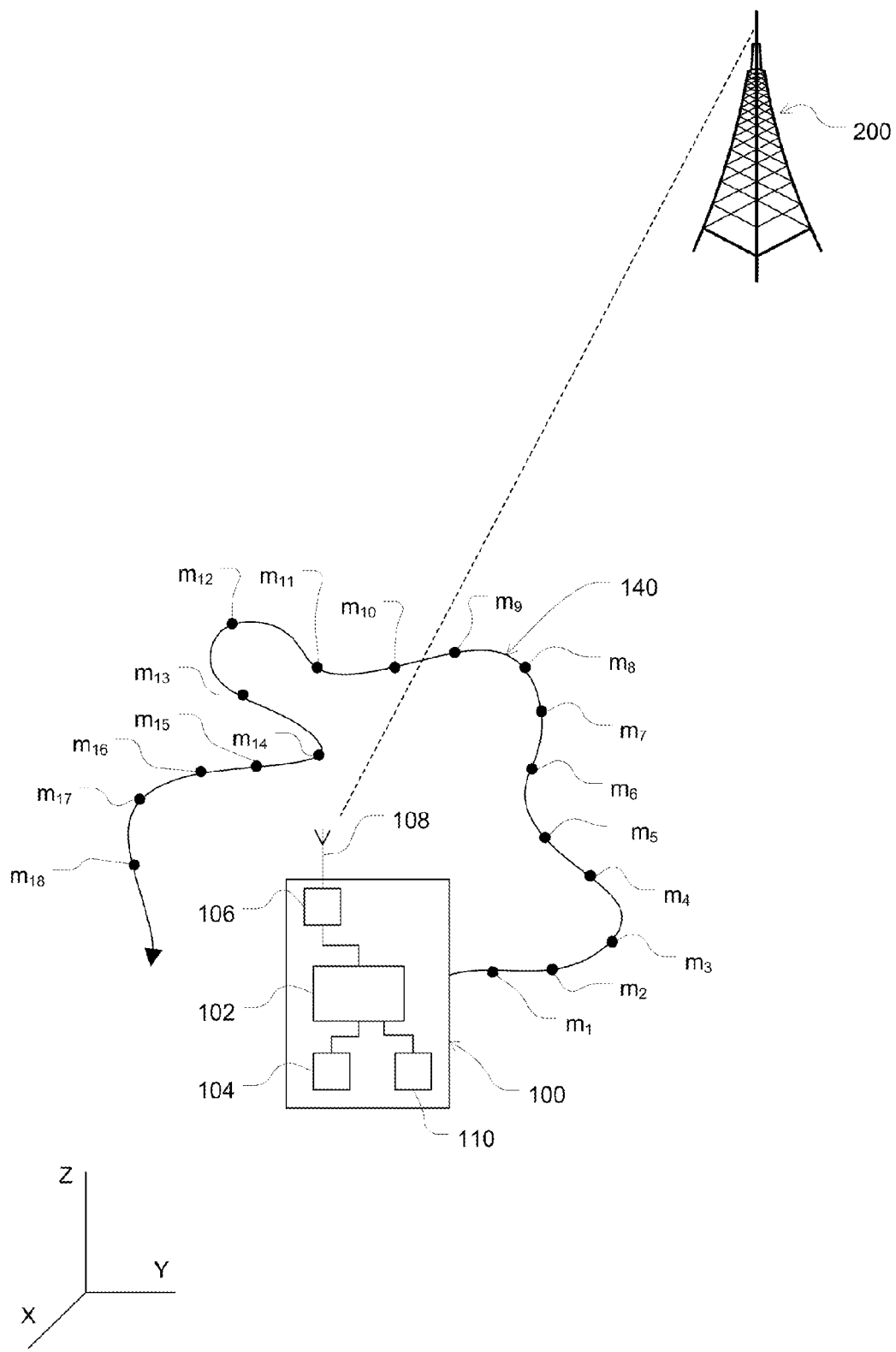
FIG. 1 is a block diagram of a portable electronic device enabling positioning according to an embodiment.

FIG. 1 is a schematic illustration of an implementation of the inventive concept. A portable apparatus 100, typically in the form of a handheld electronic device, is operable to receive a signal from a source 200. The signal is transmitted as electromagnetic waves that propagate from the source 200 to the apparatus 100, typically as radio waves or microwaves. The geographic location of the source 200 is known, or at least accessible, to the apparatus 100. Generally, the source 200 is stationary, i.e. has a fixed geographic location.

The apparatus 100 includes a processor 102, a storage device 104, a receiver or transceiver 106, an antenna 108 and a motion detector 110. In combination, the components 102-110 define a positioning system that enables the apparatus 100 to determine the direction to the source 200, and given additional input, as well as the geographic location of the source 200, the apparatus 100 is able to determine its own geographic location (in the global coordinate system XYZ). As will be explained in detail further below, the additional input may comprise information about a cardinal direction of a compass, the direction of the gravitational force, an estimated distance from the apparatus 100 to the source 200, or one or more additional estimated directions to one or more additional sources (not shown in FIG. 1). Each such additional estimated direction to an additional source may be determined in the same way as the direction to the source 200.

The apparatus 100 is configured to estimate the direction to the source 200 based on a data set which is obtained by receiving and sampling the signal at different time points while the apparatus 100 and thus the antenna 108 is moved along a random three-dimensional trajectory 140, as indicated in FIG. 1. The sampling thus results in a set of spatial measurement points $m_1$-$m_{18}$, also indicated in FIG. 1. Each measurement point $m_1$-$m_{18}$ represents one or more properties of the signal, including at least the phase of the signal, and possibly the amplitude of the signal, as sampled at the respective time point. It is to be noted that the resulting set of measurement points $m_1$-$m_{18}$ does not need to be located in a spatially uniform pattern, but could be completely random. Concurrent with the sampling of the signal, positional data is obtained from the motion detector 110. Depending on the required accuracy, the positional data may indicate the relative or absolute location of the apparatus 100 in a local coordinate system, or the corresponding location of the antenna 108 (i.e. accounting not only for translation but also rotation of the apparatus 100), for each measurement point $m_1$-$m_{18}$. The local coordinate system is defined in relation to the apparatus 100 and has no predefined relation to the global coordinate system XYZ.

In the following, for explaining the processing of the sampled signal, reference is made to the theoretical framework presented by A. Richter in "Estimation of radio channel parameters: Models and algorithms", Ph.D. Dissertation, Technische Universität Ilmenau, Ilmenau, Germany (2005), which is incorporated herein in its entirety by reference.

By associating each measurement point $m_1$-$m_{18}$ with a local position, it is possible to treat the resulting data set as a synthetic/virtual antenna array, see e.g. A. Richter (2005), Chapter 3.3, and thus to process the data set by any one of a multitude of known directional estimation algorithms based on antenna array measurements, see e.g. H. Krim and M. Viberg: Two decades of Array Signal Processing Research, IEEE Signal Processing Magazine, pp 67-94, July 1996. Such directional estimation algorithms, commonly denoted DOA (direction of arrival) algorithms, enable directional estimation based on a data set of signal properties sampled at a sufficient number of spatially separated positions with sufficiently well-defined coordinates. Those samples can be measured either by a synthetic/virtual array or a physical array. Common to such DOA algorithms is that they define a function that relates the phase of the signal, and possibly the amplitude of the signal, at different positions to the direction of arrival of the signal at the antenna array. It should be noted that in the case of a synthetic/virtual array, the single antenna used does not need to be characterized in gain and phase response. This in contrast to physical arrays, where it is important to know the variations between the individual antenna elements used. It is advantageous if the reference direction of the single antenna stays the same during the measurement interval, though this is not a strict requirement.

To further explain and exemplify the use of DOA algorithms, consider an antenna with a single antenna element 108 that is receiving a signal from a single source 200 in free space. The complex base band representation of the signal from the source transmitted at time instant $t_i$ is denoted $s(t_i)$. This complex base band signal may be an arbitrary signal, modulated or non-modulated ($s(t_i)=1$). Assume that the transmit filter has an impulse response $g_T(t)$ and the receive filter has an impulse response $g_R(t)$. The complex baseband representation of the received signal is then given by (see e.g. Richter (2005), Chapter 2.2):

$$r(t_i)=s(t_i-l_p/c_0)*g_R(t)*g_T(t)A\exp\{-j2\pi f_c l_p/c_0\},$$

where '*' denotes convolution, $c_0$ is the speed of light, $l_p$ is the electrical length of the propagation path, $f_c$ is the carrier frequency and A includes free space path loss and complex antenna gain. An equivalent frequency domain representation is given by:

$$R(f)=S(f)G_R(f)G_T(f)A\exp\{-j2\pi f\tau_p\}\exp\{-j2\pi f_c l_p/c_0\},$$

where $\tau_p=l_p/c_0$ is the time delay from the source to the receiver.

For time of arrival based methods, such as TOA and TOF, the time delay or relative time delay can be extracted from a single measurement of $r(t_i)$ by considering the impulse response (or any equivalent measure) of the channel that can be extracted by help of a transmitted broad band signal $S(f)$. The inventive method for positioning is not based on such time delays, but on the array response of the synthetic antenna array created when the antenna element 108 is moved in a volume and the received signals are sampled at different positions (measurement points $m_1$-$m_{18}$). The "array response", which is a well-known term to the person skilled in the art, refers to the M×1 complex array response of the synthetic antenna array built up from the different measurement positions to a (unit-power) source in the direction ($\theta$, $\phi$), where $\theta$, $\phi$ are the elevation and azimuth angles-of-arrival, respectively, from the source and M is the number of measurement points. Further details may be found in "Antenna Array Mapping for DOA Estimation in Radio Signal Reconnaissance" by P. Hyberg, Ph.D. Dissertation, Royal Institute of Technology, Stockholm, Sweden (2005), which is incorporated herein in its entirety by reference.

For small movements, e.g. occurring when the portable apparatus 100 is moved by its user, it is possible to neglect the changes in the delay $\tau_p$ between the measurement points, unless the observation bandwidth is really large. This is true if the movement is significantly smaller than $c_0/B$, where $c_0$ is the speed of light and B is the observation bandwidth, see Richter (2005), Chapter 2.2. It is further possible to decompose the array response, see Richter (2005), Chapter 2.4.2, into an element beam pattern shared by the antenna element 108 in all its positions (measurement points) and a phase vector relating the positions (measurement points) within the synthetic antenna array to the phases of the array response.

As will be exemplified further, the array response (e.g. given by its phase vector) is used for determining the direction to the source 200 from the synthetic antenna array. Assume that the signal is measured at a local coordinate $x_i \in R^{3\times 1}$. The frequency representation of the received signal may then be described by $$R(f)=S(f)G_R(f)G_T(f)A_0\exp\{-j2\pi f\tau_p\}\exp\{-jk_{0n}x_i^T k_n\},$$

where $k_n=-[\cos\phi_n \sin\theta_n \sin\phi_n \sin\theta_n \cos\theta_n]^T$, $\theta_n$ and $\phi_n$ are the elevation and azimuth angles-of-arrival, respectively, from the source 200, $k_{0n}=2\pi\lambda_n^{-1}$, $\lambda_n$ is the (carrier) wavelength of the signal from the source 200, and $A_0$ represents the free space path loss and complex antenna gain including the reference phase at the origin of the local coordinate system. The position specific part of the array response is given by $\exp\{-jk_{0n}x^T k_n\}$, where x is a matrix representation of the locations of all measurement points in the local coordinate system. By estimating the local positions of the measurement points by help of the motion detector 110, it is possible to form the position specific part of the array response. With this antenna array response, considering the measured phase changes during the movement, it is possible to determine the direction to the source 200.

Given that there are enough sources available and that the locations of those sources are known, it is possible to determine the location (global position) of the receiving antenna. Note that the phase is indicative of the directions to the sources and that this technique does not depend on the time for the signal to travel from the source to the receiver. The technique thereby works for arbitrary signals $s(t_i)$ from the source. For multipath channels, which are predominant for wireless communication, it should be noted that there is one phase and amplitude term associated with each multipath component and it is the incoming angle of the multipath component that is estimated.

Since the resulting data set may be treated/processed as a synthetic/virtual antenna array, the apparatus 100 may be provided with a simple and space-efficient antenna 108, which does not enable directional estimation in itself, since the resulting data set is treated/processed as a synthetic/virtual antenna array as described above. Further, the embodiment in FIG. 1 enables determination of the geographic location of the apparatus 100 without requiring access to a GNSS, such as a built-in GPS receiver.

It is also conceivable to combine the embodiment in FIG. 1 with a GNSS. For example, the apparatus 100 in FIG. 1 may include a GPS receiver (not shown), whereby the apparatus 100 may be operated in accordance with the inventive concept to provide navigational data whenever the GPS receiver fails to receive the required satellite signals or fails to determine a geographic location based on these satellite signals.

It is also conceivable to use the navigational data provided by the inventive positioning system to supplement the output data of conventional positioning systems, e.g. to reduce the impact of error propagation in such output data. Such conventional positioning systems exhibiting problems with error propagation include step counters and pedometers.

The data set may be collected after first instructing the user of the apparatus 100 to manually impart the random movement to the apparatus 100. The user may be instructed via any form of user interface (not shown) on the apparatus 100, e.g. a loudspeaker or a display screen. For example, the user may be instructed to wave the apparatus 100 in the air. Alternatively, the data set may be collected based on "natural" user movements, e.g. while the apparatus 100 is carried around by the user or while the apparatus 100 is located in a moving vehicle.

The apparatus 100 (its receiver/transceiver 106) should be coherent with the source 200 during the measurement period such that only minimal frequency drift is allowed between the source 200 and the receiver/transceiver 106. In other words, all phase and amplitude variations of the received signal over the different measurement points $m_1$-$m_{18}$ should be predominantly or exclusively caused by the movement of the apparatus 100. The signal may be a repeated signal, i.e. a known or unknown signal transmitted at some specific time instants, and/or a signal known to the apparatus 100 but not necessarily repeated. The important aspect is that the apparatus 100 is able to distinguish the phase and amplitude variations caused by the movements from those caused by the transmitted signal. Furthermore, the signal may be broadband or narrowband since transit times are not used for the directional estimate. If the signal is repeated and has a given coherence time, the apparatus 100 may be configured to actively set the measurement period not to exceed this coherence time. The coherence time of an electromagnetic signal is the time over which a propagating wave may be considered coherent, i.e. it is the time interval within which its phase is predictable. It is conceivable that the apparatus 100 (the receiver/transceiver 106) is actively synchronized with the remote source 200 before and/or during the measurement period.

It is currently believed that an adequate accuracy of the estimated direction of the source 200 (or alternatively, the geographic location of the apparatus 100) is obtained for a data set containing at least 3 measurement points, and preferably at least 8 measurement points, at least 20 measurement points or at least 30 measurement points. Apart from the computational complexity, there is no upper limit for the number of measurement points acquired during a measurement period. It is well known that the variance of the directional estimate decreases when the antenna array aperture is increased, see e.g. Richter (2005), Chapter 3.3. Usually the aperture is between one and up to a couple of wavelengths, but it may be smaller as well as considerably larger.

Generally, each measurement period is dedicated to sampling of the signal originating from a specific source 200. Thus, if the apparatus 100 is to receive signals from plural sources, the apparatus initiates one measurement period for each source. However, from the user's perspective this sequence of measurement periods could be merged into one session for navigational positioning of the apparatus. If the hardware of the apparatus 100 allows it, the measurements of several sources may be performed in a parallel fashion as well.

Returning to the example in FIG. 1, the processor 102 is connected to receive an input from the motion detector 110. The motion detector 100 may be, for example, an inertial measurement unit (IMU), which may include a three dimensional accelerometer configured to detect translation of the apparatus 100 in any direction. The IMU may, for example, also comprise a magnetometer and/or a gyrometer for detecting rotation of the apparatus. Alternatively, the motion detector 110 may be based on any other available technology for relative or absolute positioning, including but not limited to odometers, laser based rangefinders (provided by e.g. Hokuyo Automatic Co, Ltd), ultrasonic rangefinders (e.g. by Maxbotics Inc), camera based positioning, either based on single (e.g. by Mesa Imaging AG) or multiple cameras (e.g. by NASA) or by a camera replacing the IMU.

The processor 102 may be any type of processing circuitry. For example, the processor 102 may be a programmable processor that interprets computer program instructions and processes data. Alternatively, the processor 102 may be, for example, programmable hardware with embedded firmware. The processor 102 may be a single integrated circuit or a set of integrated circuits (i.e. a chipset). The chipset may be incorporated within a module, which may be integrated within the apparatus 100, and/or may be separable from the apparatus 100. The processor 102 may also be a hardwired, application-specific integrated circuit (ASIC).

The processor 102 is connected to receive an input from the receiver/transceiver 106. The receiver/transceiver 106 may be operable to receive the above-mentioned signal(s), and optionally to transmit other signals. The receiver/transceiver 106 is connected to the antenna 108. In one embodiment, the antenna 108 has a single antenna element for receiving the signal(s).

The processor 102 is also connected to read from and write to the storage device 104. The storage device 104 is, in this example, operable to store computer program instructions, and may be a single memory unit or a plurality of memory units. If the storage device 104 comprises a plurality of memory units, part or the whole of the computer program instructions may be stored in the same or different memory units.

The computer program instructions stored in the storage device 104 control the operation of the apparatus 100 when loaded into the processor 102. The computer program instructions provide the logic and routines that enable the apparatus 100 to perform the methods illustrated in FIGS. 2 and 4, and described below.

The computer program instructions may arrive at the apparatus 100 via an electromagnetic carrier signal or be copied from a physical entity such as a computer program product, a memory device or a record medium such as a CD-ROM or DVD.

Figure 2:
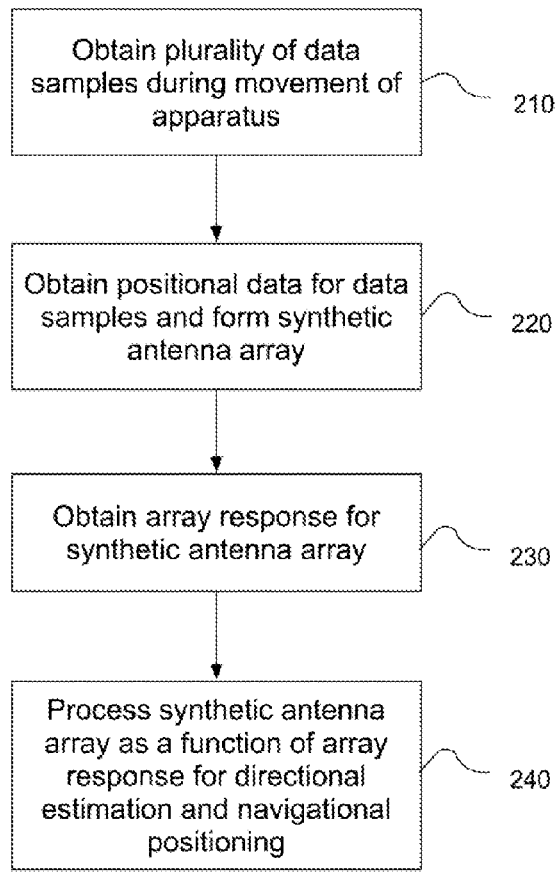
FIG. 2 is a flowchart of a method for operating the device in FIG. 1.

FIG. 2 is a flow chart of an exemplifying method for operating the apparatus in FIG. 1. In this embodiment, at step 210 in FIG. 2, the apparatus 100 is operated to obtain a plurality of data samples from the signal at different time points during the measurement period with arbitrary movement of the apparatus 100. Depending on implementation, the data samples may be extracted from the signal by either the receiver/transceiver 106 or the processor 102, or a combination thereof. As indicated above, each data sample represents the phase of the signal, and may also represent the amplitude of the signal. At step 220, the apparatus associates each data sample with a local position obtained from the motion detector 110 so as to form a synthetic antenna array. The formation of the synthetic antenna array is typically performed by the processor 102, which obtains the positional data for each data sample from the motion detector 110. At step 230, the apparatus obtains the array response of the synthetic antenna array. At step 240, the apparatus 100 processes the synthetic antenna array obtained in step 220, as a function of the array response obtained in step 230, to identify the relative location of the apparatus 100 and the source 200 (e.g. given by the direction to the source 200), and identifies its own geographic location using the relative location and the known geographic location of the source 200.

Below follows a detailed example of an embodiment based on reception of GSM signals, i.e. the apparatus 100 is a mobile communications terminal adapted for communication over a GSM system. However, it is to be understood that the illustrated embodiment is not limited to GSM systems only, but the mobile communications terminal could operate on signals from any type of available source with a known geographic location, including wireless access points (WAP) for local area networks (e.g. the IEEE 208.11 family), base stations (BS) for any type of cellular system (e.g., GSM, W-CDMA, LTE, WiMAX, IS-95, CDMA2000, D-AMPS, EV-DO), as well as dedicated transmitters.

Figure 3:
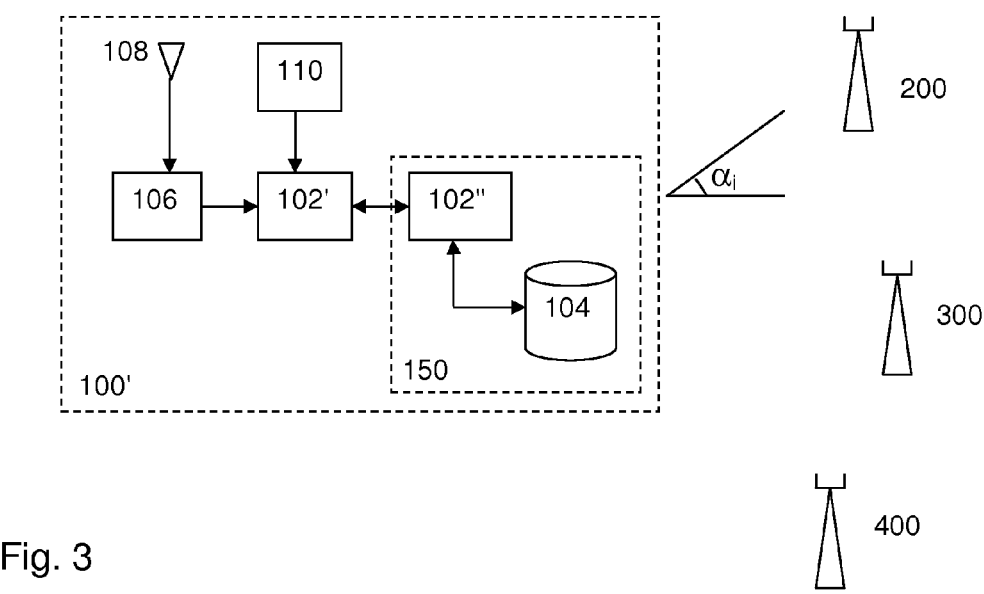
FIG. 3 is a block diagram of a positioning system on a mobile phone according to an embodiment.

FIG. 3 is a block diagram of a positioning system 100' in a mobile communications terminal. The positioning system 100' consists of an antenna 108, an RF processing unit 106 (corresponding to the receiver/transceiver in FIG. 1), a digital signal processing unit 102', a three dimensional local positioning unit 110 (corresponding to the motion detector in FIG. 1) and a controller 150. In the controller 150, there is a processor (CPU) 102" and a storage device 104 containing a database of base stations and their geographic locations (e.g., GPS coordinates), and possibly also the frequencies they are using. The local positioning unit 110 is attached to the antenna 108 so that it is possible to calculate the local movements of the antenna 108. It could be noted that in this example, the functionality of the processor 102 in FIG. 1 is implemented by the digital signal processing unit 102' and the CPU 102".

Figure 4:
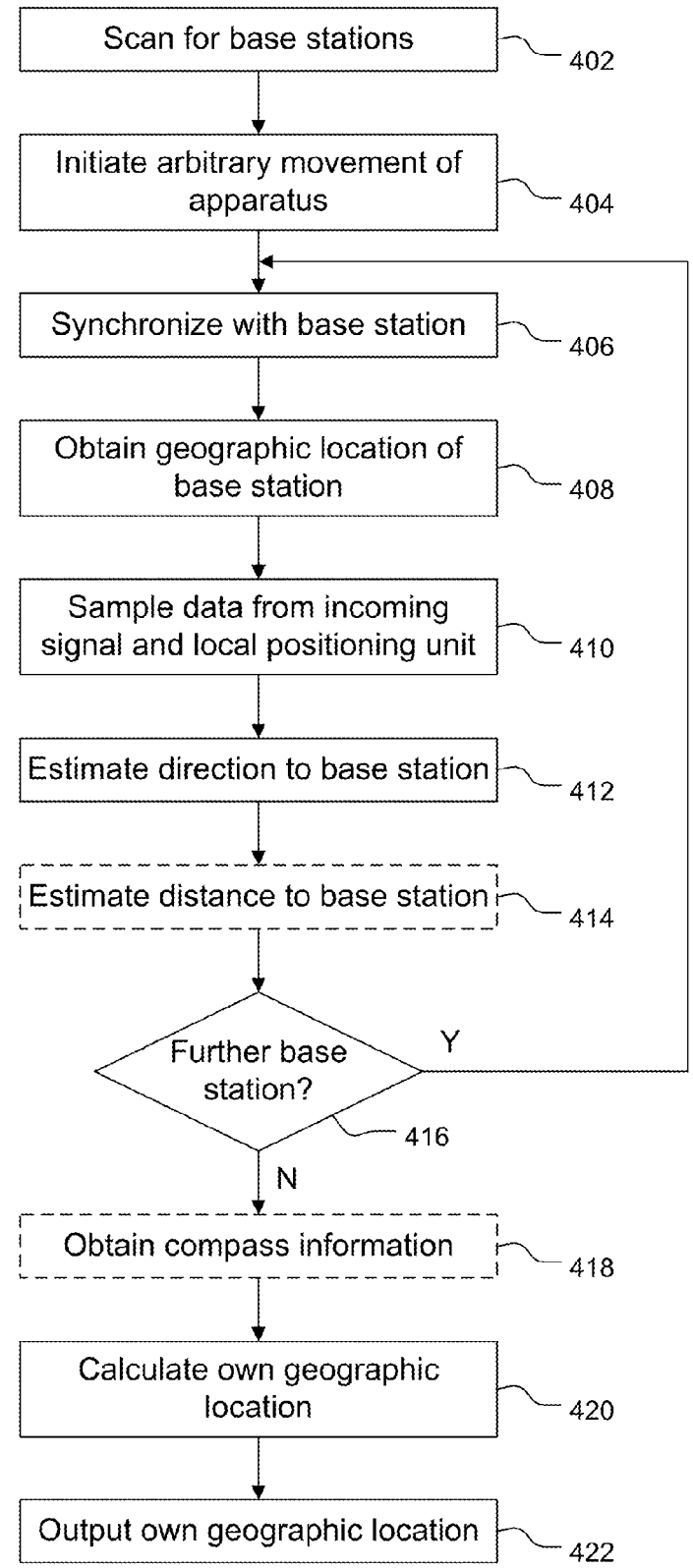
FIG. 4 is flowchart of a method for operating the device in FIG. 3.

FIG. 4 is a flowchart to exemplify the operation of the positioning system 100' in FIG. 3. First, the system 100' initiates positioning by scanning the frequency spectrum for available base stations (step 402). Then, the system 100' ensures that it will be subjected to an arbitrary movement during the directional estimation, e.g. by outputting instructions to the user via a user interface (step 404). Alternatively, step 404 may be replaced or supplemented by a step of monitoring the output signal of the motion detector 110 to verify that the system 100' is in adequate motion.

For each identified base station 200-400, the system 100' now executes a sequence of steps 406-412 that collectively define a measurement period. In step 406, the system locks the RF processing unit 106 to the base station frequency of a first base station 200 to get coherent reception. This is done, e.g., by listening to the frequency correction channel (FCCH) in GSM and correcting any frequency offset between the local oscillator in the RF processing unit 106 and in the base station 200. The RF processing unit 106 also finds time synchronization by listening to the synchronization channel (SCH). Once time synchronization is established, the base station ID may be obtained from the broadcast control channel (BCCH) so that the CPU 102" may read the physical location of the base station 200 from the list in the database 104 (step 408). If the physical location is not found in the database 104, the process may jump to step 416, otherwise it proceeds to step 410.

Accordingly, once time and frequency synchronization is achieved and the system 100' knows the base station ID, the RF processing unit 106 starts measuring the phase and amplitude variations of a repeated, usually known, signal when the antenna 108 is moved while the output signal from the local positioning unit 110 simultaneously is recorded so that the physical movement of the antenna 108 may be calculated between the measurement points and hence the local coordinates of the measurement points may be calculated (step 410). The repeated signal might, e.g., be the synchronization sequence inside the GSM synchronization burst or the training sequence in a normal GSM burst. In this way the received phase and amplitude of the received signal is recorded in several random, but known, positions. Assuming that the environment is static and the only movement is that of the receiving antenna 108, the digital signal processing unit 102' forms a synthetic/virtual antenna array, and applies known DOA algorithms, e.g., beamforming techniques such as Bartlett beamforming or Capon beamforming, or known parameter estimation methods such as SAGE to estimate the direction $\alpha_i$ of the incoming signal (step 412). These techniques may presume that the received signal is a sum of plane waves, but there are also available techniques designed to handle near-field effects. This direction is often similar to the physical direction to the base station 200, but may vary due to obstructions of the signal path.

Optionally, the digital signal processing unit 102' may also estimate the distance to the base station 200, e.g. by determining a propagation delay of the repeated signal, or another signal emitted by the base station 200 (step 414).

The system 100' then repeats steps 406-414 for each further base station 300, 400 identified in step 402 (step 416). Optionally, the system 100' may limit the processing to a given number of base stations, e.g. a number deemed to result in a sufficient accuracy of the geographic location to be calculated in step 420.

When all iterations of steps 406-414 are completed, the system 100' has access to a set of directional estimates $(\alpha_i)$ to the different base stations 200-400, and the geographic location of each base station 200-400. The system may also have an estimated distance to one or more base stations 200-400.

Optionally, the digital signal processing unit 102' may also obtain compass information and/or the direction of the gravitational force, i.e. an indication about the orientation of the system 100' in relation to the coordinate system of the geographic locations (step 418). The compass information may, e.g., identify the direction of one of the cardinal directions of the compass. Such compass information may be obtained from a magnetometer or another type of magnetic sensor in the system 100'. The direction of the gravitational force may, e.g., be obtained by accelerometers.

Based on the available data (direction(s), and possibly distance(s) and/or compass information), the digital signal processing unit 102" estimates the geographic location of the positioning system 100' by means of triangulation (step 420). The estimated location may be derived as a position on a map where the available data has the best match to all available base stations 200-400. Finally, the estimated geographic location is output, e.g. for display to the user on the mobile communication terminal, for transmission from the terminal, or for further processing in the terminal (step 422).

It should be realized that the inventive positioning system may be advantageously implemented on existing portable electronic devices, and in particular on radio communication devices such as mobile phones. When implemented on mobile phones, the positioning system may use the existing mobile communication infrastructure such as base stations, and involve only minor modifications of the mobile phones, typically by installing dedicated software. It should be noted that the directional estimation and positioning may be performed without support from the cellular network as long as the geographic locations of the surrounding base stations are known to the mobile phone. It should also be noted that many modern mobile phones have built-in accelerometer/gyrometer/magnetometer and/or cameras which may be used in the inventive positioning system.

By implementing the inventive positioning system in mobile phones, it is possible to fulfil existing and future legal requirements (e.g. in the U.S.) that mobile phones should be enable automatic positioning, when making emergency calls, without access to a GNSS.

Figure 5:
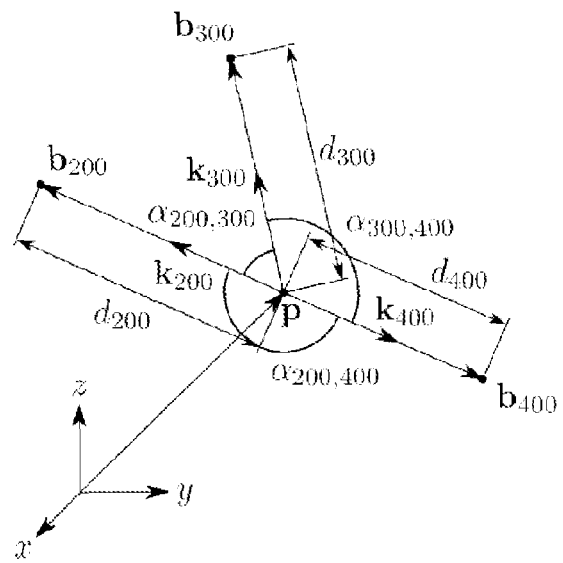
FIG. 5 is a definition of coordinates and vector for positioning of a portable electronic device once angle-of-arrival estimates are known.

The triangulation step 420 (FIG. 4) will now be further exemplified with reference to FIG. 5, which illustrates the system 100' in a global Cartesian coordinate system, after determination the directions-of-arrival to N sources (base stations). The task is now to determine the geographic location of the system 100' given by $p=[p_x\ p_y\ p_z]^T$ where $[\cdot]^T$ denotes the transpose operation. The directions of arrival from source n in the azimuth and elevation planes, $\phi_n$ and $\theta_n$, respectively, are related to the direction vector $k_n$ by $$k_n = [\cos \phi_n \sin \theta_n\ \sin \phi_n \sin \theta_n\ \cos \theta_n]^T$$

which may be related to p and the position of source n, whose coordinates $b_n=[b_{nx}\ b_{ny}\ b_{nz}]^T$ are known to the system 100', by $$k_n = \frac{b_n - p}{d_n}$$

where $d_n$ is the distance between p and source n given by $$d_n = \sqrt{(b_n-p)^T(b_n-p)}.$$

If the system 100' does not know its rotation relative the global coordinate system, it does not know $k_n$ explicitly, but only the angle $\alpha_{mn}$ between each two direction vectors $k_m$ and $k_n$, which is given by their scalar product as $$\cos \alpha_{mn} = k_m^T k_n$$

Note that $\alpha_{mn}$ is independent of the coordinate system.

Figure 6A:
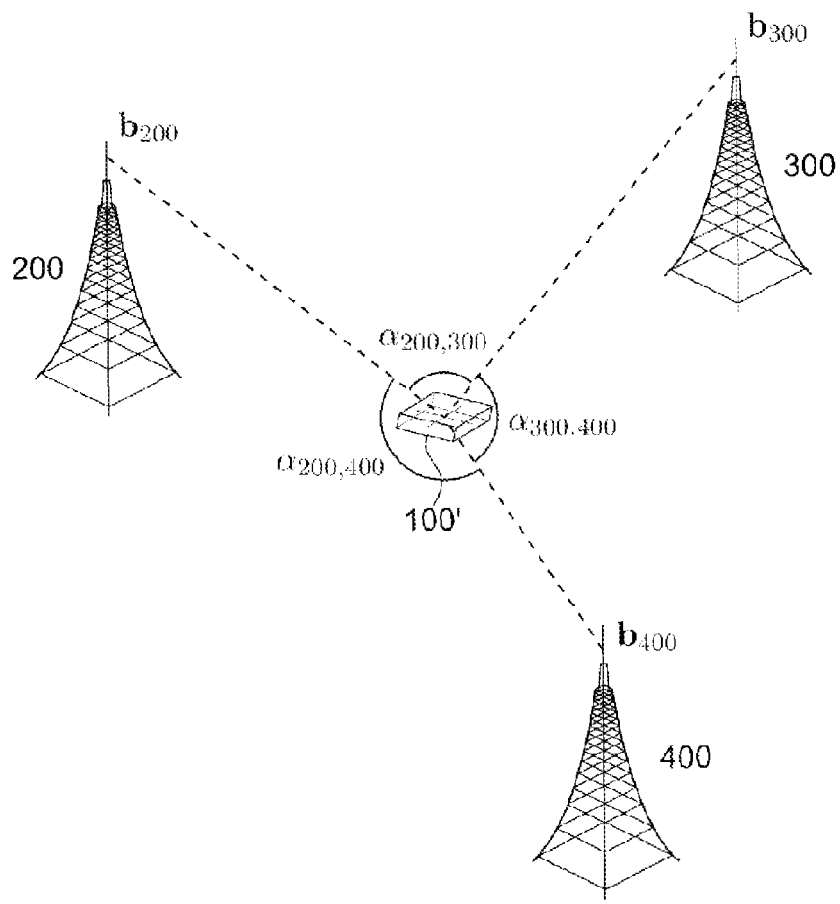
FIG. 6A-6C are diagrams to exemplify the required information for positioning when different number of sources are available.

If signals from three sources 200, 300 and 400 are available, as illustrated in FIG. 6A, the system 100' may estimate its position without knowing its rotation relative the global coordinate system, i.e., without explicit knowledge of the direction vectors $k_{200}$, $k_{300}$ and $k_{400}$. This is done by solving the equation system:

$$\begin{cases} \dfrac{(b_{200}-p)^T(b_{300}-p)}{\sqrt{(b_{200}-p)^T(b_{200}-p)(b_{300}-p)^T(b_{300}-p)}} = \cos\alpha_{200,300} \\ \dfrac{(b_{200}-p)^T(b_{400}-p)}{\sqrt{(b_{200}-p)^T(b_{200}-p)(b_{400}-p)^T(b_{400}-p)}} = \cos\alpha_{200,400} \\ \dfrac{(b_{300}-p)^T(b_{400}-p)}{\sqrt{(b_{300}-p)^T(b_{300}-p)(b_{400}-p)^T(b_{400}-p)}} = \cos\alpha_{300,400} \end{cases}$$

Figure 6B:
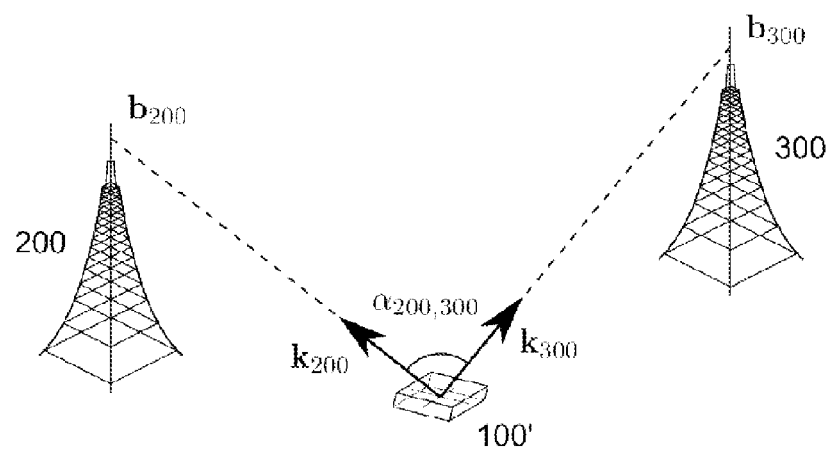

If signals from two sources 200 and 300 are available and the system 100' has access to compass information and the direction of the gravitational force, i.e., knows the direction vectors $k_{200}$ and $k_{300}$, as illustrated in FIG. 6B, the system 100' may estimate its position by solving the equation system:

$$\begin{cases} p - b_{200} + d_{200}k_{200} = 0 \\ p - b_{300} + d_{300}k_{300} = 0 \end{cases}$$

Note that the system 100' does not have to know the distances $d_{200}$ and $d_{300}$.

Figure 6C:
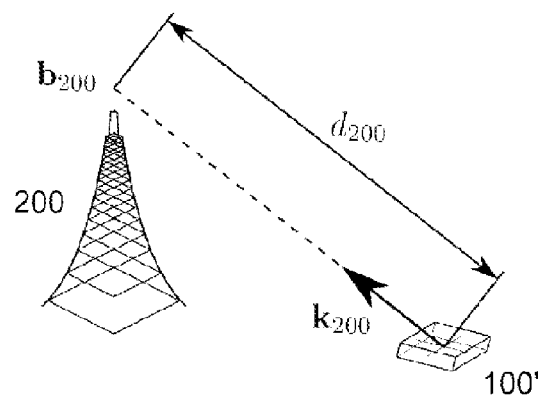

If the signal from a single source 200 is available, and the system 100' has access to compass information, the direction of the gravitational force, and knows the distance to the source, as illustrated in FIG. 6C, it can estimate its position by solving the equation:

$$p - b_{200} + d_{200}k_{200} = 0.$$

It is to be understood that the above examples indicate the required minimum number of sources. In a practical situation, it may be desirable to use an increased number of sources, e.g. to improve accuracy or robustness via redundancy in the positional estimation.

Returning to the process in FIG. 4, steps 414 and 418 may be selectively executed based on the number of available base stations. In other words, one or both of these steps are only executed if deemed necessary in view of the available number of base stations.

Looking now in more detail at techniques for estimating the geographic location based on estimated directions only, these techniques may be divided into two major categories: explicit triangulation and inherent triangulation.

Figure 7:
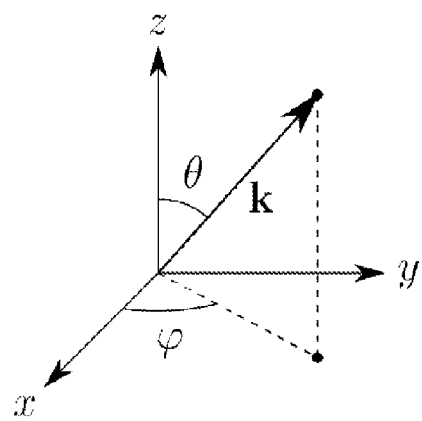
FIG. 7 is a definition of angles-of-arrival in elevation and azimuth.

In explicit triangulation, a cost function $f(\theta_n, \phi_n)$ may be defined for each source (base station) n to include the directional estimation (DOA) algorithm (e.g. a synthetic antenna array algorithm), given as a function of the elevation angle ($\theta_n$) and the azimuth angle ($\phi_n$), for the synthetic antenna array defined by the sampled data (e.g. phase and local position). The definition of the angles $\theta$, $\phi$ for the direction vector k is given in FIG. 7. The cost function is minimized for the angles $\{\hat\theta_n, \hat\phi_n\}$. Thus, for each source, the following optimization is executed:

$$\{\hat\theta_n, \hat\phi_n\} = \underset{\theta_n\varphi_n}{\operatorname{argmin}} f(\theta_n, \varphi_n)$$

The estimated direction to the source is given by $\hat\theta_i$. The geographic location of the apparatus is then estimated by minimizing another cost function $J(\hat\theta_1, \hat\theta_2, \ldots, \hat\theta_N)$, N being the number of available sources. The cost function J may be based on an explicit triangulation of the estimated direction, such that minimizing the cost function J finds the most likely intersection point for all estimated directions.

In inherent triangulation, a cost function $g(\theta_1, \phi_1, \theta_2, \phi_2, \ldots, \theta_N, \phi_N)$ may be defined for all N sources to include the directional estimation (DOA) algorithm (e.g. a synthetic antenna array algorithm), given as a function of the elevation angles ($\theta_1, \ldots, \theta_N$) and the azimuth angles ($\phi_1, \ldots, \phi_N$), for the ensemble of synthetic antenna arrays defined by all data samples. Thus, the optimization of this cost function directly yields the estimated geographic location, i.e. without first estimating the individual directions to the sources:

$$p = [p_x\ p_y\ p_z]^T = \underset{\theta_1,\varphi_1,\theta_2,\varphi_2,\ldots,\theta_N,\varphi_N}{\operatorname{argmin}} g(\theta_1, \varphi_1, \theta_2, \varphi_2, \ldots, \theta_N, \varphi_N)$$

It should be understood that the cost function g does not need to be defined as a function of elevation and azimuth angles, but could instead be defined based on a so-called state space model for the relevant underlying process which, as explained above, is based on the array response of the synthetic antenna array. Thus, the cost function g may be defined to directly relate the estimated geographic location to the array response. It should also be realized that the minimization of a cost function is merely given as an example, and both the explicit triangulation and the inherent triangulation could involve optimization of other types of functions.

Explicit triangulation generally involves a lower mathematical and computational complexity, and it does not have to be designed for a predetermined number of available sources. If the minimization of the cost function f results in a majority of correctly estimated directions to the different sources, the explicit triangulation will be able to identify the geographic location of the apparatus as the intersection given by the majority of estimated directions. Typically, incorrectly estimated directions result from signal reflections, and thus originate from incoming signals of reduced signal strength. If the signals received from all sources have essentially equal (high) signal strength, the explicit triangulation might be suboptimal and it may be advantageous to use the inherent triangulation instead. The inherent triangulation does not estimate the directions to the sources sequentially, but instead the directions are embedded as parameters in an overall function (signal model) and the estimated geographic location is obtained by optimizing all angles collectively.

In one embodiment, the positioning process may actively switch between the inherent and explicit triangulation based on the signal strengths of the individual incoming signals and/or the number of available sources. In the example of FIG. 4, such a switching step may be included between steps 402 and 404, wherein a switch to inherent triangulation causes the process to eliminate step 412, and to minimize the cost function g in step 420.

As indicated above, there are numerous available synthetic/virtual antenna array algorithms that may be applied directly, or after modification, for directional estimation. Such algorithms include both beamforming algorithms and parameter estimation algorithms. Yet another simplified DOA algorithm for directional estimation is given below.

Consider an antenna with a single antenna element, and a receiver that is continuously receiving signals from N sources (base stations). The receiver (antenna) is moved in a volume and the received signals are sampled at the time instances $t_0, \ldots, t_{k-1}$. The local coordinates of the receiver (antenna) are determined at the time instances $t_0, \ldots, t_{k-1}$ using the motion detector. The sampled signal data, which may be measured in a sequential or parallel manner, is stored in a matrix $s \in C^{N \times k}$, where each row $s_n$ contains k signal samples from source n. The local coordinates are stored in a matrix $x \in R^{3 \times k}$. The (complex base band) signal from source n received at time instant $t_i$ is denoted $s_{ni}$, whereas the coordinate vector for this signal sample is $x_i \in R^{3 \times 1}$. The signal samples are used to form a synthetic antenna array, which for each source n has an array response $$a_n(\theta, \phi) = \exp\{-jk_{0n}x^T k\}$$

where $\theta$ and $\phi$ are the elevation and azimuth angles-of-arrival, respectively, $k = -[\cos \phi \sin \theta \sin \phi \sin \theta \cos \theta]^T$, $k_{0n} = 2\pi \lambda_n^{-1}$ and $\lambda_n$ is the (carrier) wavelength of the signal from source n. For each source n, the elevation and azimuth angles-of-arrival are derived from $$\{\hat{\theta}_n, \hat{\varphi}_n\} = \underset{\theta, \varphi}{\operatorname{argmax}} \left\{ \frac{a_n(\theta, \varphi)^H s_n s_n^H a_n(\theta, \varphi)}{a_n(\theta, \varphi)^H a_n(\theta, \varphi)} \right\}$$

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the inventive concept is not limited to mobile phones but could be applied to any other type of portable electronic device, such as a laptop computer, a palmtop computer, a PDA (Personal Digital Assistant), a tablet computer, a subnotebook computer, a netbook computer, a digital camera, a portable media player, a game console, a digital e-book reader, a digital radio apparatus, or any type of device with a signal receiving unit, a local positioning unit, and a processor or equivalent means for directional estimation and navigational positioning.

The invention claimed is:

1. A method of determining a geographic location of a portable electronic device, said portable electronic device comprising a signal receiving unit configured to receive a signal from at least one remote transmitter, and a local positioning unit for determining a local position of the portable electronic device, said method comprising:
   obtaining a plurality of data samples from the signal, wherein the plurality of data samples are obtained by sampling the signal at different time points during a measurement period with arbitrary movement of the portable electronic device;
   associating each data sample with a local position obtained from the local positioning unit so as to form a synthetic antenna array;
   obtaining an array response of the synthetic antenna array, said array response comprising a model of a signal response at local positions in terms of at least a phase of the signal; and
   identifying the geographic location of the portable electronic device, by processing the synthetic antenna array as a function of the array response and by using knowledge about the geographic location of the or each transmitter.

2. The method of claim 1, wherein the array response is a model of at least the phase of the signal at the local positions as a function of the relative location between the synthetic antenna array and the transmitter, while neglecting any differences in time delay between the local positions with respect to the transmitter.

3. The method of claim 1, wherein the signal is an arbitrary signal.

4. The method of claim 1, wherein the signal is a narrowband signal.

5. The method of claim 1, wherein the step of processing the synthetic antenna array comprises evaluating the phase of the signal at the local positions in relation to a function $\exp\{-jk_{0n}x^T k_n\}$, in which $k_n$ is a direction vector from the synthetic antenna array to one of the remote transmitter(s), $k_{0n} = 2\pi \lambda_n$, $\lambda_n$ is the wavelength of the signal from said one of the remote transmitter(s), and x is a matrix representation of the local positions.

6. The method of claim 1, wherein the step of processing the synthetic antenna array comprises optimizing a function that relates amplitude and phase of the signal at the local positions to the direction of arrival of the signal at the synthetic antenna array.

7. The method of claim 1, wherein the step of processing the synthetic antenna array comprises extracting a direction from the portable electronic device to the or each remote transmitter.

8. The method of claim 7, wherein the direction is identified by processing the array response by a direction of arrival (DOA) algorithm.

9. The method of claim 1, wherein the step of processing the array response comprises optimizing a function that directly relates an ensemble of data samples, which are obtained from a set of different remote transmitters, to the geographic location of the portable electronic device with respect to the remote transmitters.

10. The method of claim 1, wherein the signal receiving unit is synchronized with the remote transmitter during the measurement period.

11. The method of claim 1, wherein the length of the measurement period is selected not to exceed a coherence time of the signal.

12. The method of claim 1, wherein the signal receiving unit comprises an antenna, wherein each local position is obtained to represent the local position of the antenna.

13. The method of claim 1, wherein the signal receiving unit comprises an antenna with a single antenna element.

14. The method of claim 1, wherein the plurality of data samples comprises at least 3 data samples, and preferably at least 8 data samples.

15. The method of claim 1, wherein the local positioning unit comprises one or more of an inertial measurement system, which includes accelerometers with or without gyrometers, a laser positioning system, an ultrasound positioning system, a dead reckoning system, a robot, an odometer, and a camera system.

16. The method of claim 1, wherein the or each remote transmitter is stationary.

17. The method of claim 16, further comprising obtaining an identity of the or each remote transmitter via the signal receiving unit, and determining the geographic location of the or each remote transmitter based on the identity.

18. The method of claim 1, wherein the portable electronic device is a mobile communications terminal, and the or each remote transmitter is a wireless access point or a base station.

19. The method of claim 1, wherein the signal is an existing signal emitted by the or each remote transmitter for reception by the signal receiving unit during regular operation of the portable electronic device.

20. The method of claim 1, further comprising instructing a user of the portable electronic device to manually impart the random movement to the portable electronic unit during the measurement period.

21. A non-transitory computer-readable medium comprising program instructions that, when executed by a processor in a portable electronic device, performs the method of claim 1.

22. A computer program product loadable into a memory of a portable electronic device for performing the method of claim 1.

23. A portable electronic device, comprising:
a signal receiving unit configured to receive a signal from at least one remote transmitter;
a local positioning unit for determining a local position of the portable electronic device; and
a processor, configured to obtain a plurality of data samples from the signal at different time points during a measurement period with random movement of the portable electronic device, associate each data sample with a local position obtained from the local positioning unit so as to form a synthetic antenna array, obtain an array response of the synthetic antenna array, said array response comprising a model of a signal response at local positions in terms of at least a phase of the signal, and identify the geographic location of the portable electronic device, by processing the synthetic antenna array as a function of the array response and by using knowledge about the geographic location of the or each remote transmitter.

24. A portable electronic device, comprising:
a signal receiving unit configured to receive a signal from at least one remote transmitter;
a local positioning unit for determining a local position of the portable electronic device;
means for obtaining a plurality of data samples from the signal at different time points during a measurement period with random movement of the portable electronic device;
means for associating each data sample with a local position obtained from the local positioning unit so as to form a synthetic antenna array;
means for obtaining an array response of the synthetic antenna array, said array response comprising a model of a signal response at local positions in terms of at least a phase of the signal; and
means for identifying the geographic location of the portable electronic device, by processing the synthetic antenna array as a function of the array response and by using knowledge about the geographic location of the or each remote transmitter.

* * * * *